UNITED STATES PATENT OFFICE.

JOHN J. FITZGERALD, OF CHICAGO, ILLINOIS, ASSIGNOR TO EUGENE M. KEELEY AND HARRY C. WILD.

PROCESS FOR SMOKING HAMS, SHOULDERS, AND JOINT-MEAT IN GENERAL AND THE PRODUCT THEREOF.

1,122,715.      Specification of Letters Patent.      Patented Dec. 29, 1914.

No Drawing.      Application filed June 22, 1914. Serial No. 846,443.

*To all whom it may concern:*

Be it known that I, JOHN J. FITZGERALD, a citizen of the United States, residing at Chicago, in the county of Cook and State of Illinois, have invented certain new and useful Improvements in Processes for Smoking Hams, Shoulders, and Joint-Meat in General and the Product Thereof, of which the following is a specification.

In the ordinary process of curing joint meat it is hung uncovered in the smoke house where it is subjected to heat and smoke for the required period. This has the effect of heating and drying the skin and exposed flesh or fiber of the joint, with the result that the former becomes hard and horny while the exposed lean fiber, particularly at the larger end of the joint, splits or cracks to a considerable depth, and the smoke entering the cracks and crevices hardens and blackens the meat forming the walls thereof. When the meat is cut or sliced for sale or consumption, the blackened and hardened end section must be discarded at least to the extent to which it has cracked as it is practically unfit for use. Furthermore, with the shrinkage of the joint which accompanies smoking the meat loses shape, that on the butt side dropping or sagging while the meat on the flank spreads out. The trimming which is made necessary by the cracking of the meat and the loss of shape of the joint, amounts to a very considerable fraction of the weight in the case of each ham.

It is the object of my invention to save this loss by protecting and gently compressing the ham or shoulder during smoking from the extreme heat while permitting the proper access of smoke and heat thereto, and at the same time keeping it moist with its own juices, so that the skin is kept comparatively soft, the meat or fiber prevented from cracking and the joint retained in its compact shape.

With this purpose in view my invention consists in inclosing the ham or shoulder in a tight fitting jacket of porous elastic fabric which permits free access of the smoke to the meat, which contracts with the shrinkage of the ham at all times providing a pressure thereon tending to keep the parts of the joint together and in compact form, and receives the juices of the meat which keep it moist and also moisten the skin and exterior of the meat, preventing them from hardening and the latter from cracking as above described. The elastic material which I have found best adapted for the purpose and which may be economically obtained and used for the purpose, is stockinet. This material is commonly knitted in a seamless tube which may be turned out of indefinite length by an automatic machine for the purpose. The continuous tube of stockinet as it comes from the mill is divided into the required lengths to form the jackets and the joints inserted in said jackets which fit them tightly. The jackets are closed at one end as by tying or sewing the edges together and the joints inserted therein and tightly covered thereby, the open end of the tube being closed after the joint is covered.

The operation of smoking may be carried out precisely as formerly. As the ham or other joint becomes heated the juices thereof flow out and are received in and moisten the knitted cover which also receives in and through its meshes the smoke employed in the curing operation which mingles with the juices and give them in a high degree the desired flavor of smoked meat. The stockinet, however, holds the juices in close contact with the joint, the surface of which is continually moistened thereby so that the heat of the smoking operation does not dry out and harden the skin or cause the fiber to crack open as above described. The jacket compresses the projecting portions of the joint and as the latter shrinks the jacket follows, at all times maintaining the compact shape of the ham. As a result when the ham is cut for use there need be no wasting at the end thereof but on the contrary all that portion of the meat heretofore thrown away and discarded may be used and is as desirable as any other portion of the joint and the skin is kept in such condition as to be comparatively easily cut. The jacket protects the meat during handling in the process and afterward and preferably is removed only when the contents thereof are to be used.

I claim:

1. A method of curing joint meat which consists in first inclosing the same in a close fitting jacket of porous elastic material and then subjecting it to the action of heat and smoke.

2. The process for curing joint meat consisting in inclosing the joint in an elastic, porous jacket of stockinet and then heating and smoking the same, whereby the jacket exerts a constant pressure upon the meat during shrinkage and prevents cracking of the butt.

JOHN J. FITZGERALD.

Witnesses:
JOHN B. MACAULEY,
ROBERT DOBBERMAN.